(12) United States Patent
Hiruta et al.

(10) Patent No.: US 11,951,942 B2
(45) Date of Patent: Apr. 9, 2024

(54) VEHICLE CONTROL DEVICE AND VEHICLE

(71) Applicant: HONDA MOTOR CO., LTD., Tokyo (JP)

(72) Inventors: Shigenori Hiruta, Wako (JP); Hiroyuki Hayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 795 days.

(21) Appl. No.: 17/069,264

(22) Filed: Oct. 13, 2020

(65) Prior Publication Data
US 2021/0114555 A1 Apr. 22, 2021

(30) Foreign Application Priority Data
Oct. 17, 2019 (JP) .................................. 2019-190339

(51) Int. Cl.
*B60R 25/24* (2013.01)
*B60R 25/10* (2013.01)
*B60R 25/34* (2013.01)

(52) U.S. Cl.
CPC .......... *B60R 25/24* (2013.01); *B60R 25/1001* (2013.01); *B60R 25/1004* (2013.01); *B60R 25/34* (2013.01); *B60R 2325/10* (2013.01)

(58) Field of Classification Search
CPC . B60R 25/24; B60R 25/1001; B60R 25/1004; B60R 25/34; B60R 2325/10
See application file for complete search history.

(56) References Cited

U.S. PATENT DOCUMENTS

2018/0099643 A1\* 4/2018 Golsch .................. G01S 13/765

FOREIGN PATENT DOCUMENTS

| JP | 2004-352018 | 12/2004 |
|----|-------------|---------|
| JP | 2014-054902 | 3/2014 |
| JP | 2014-054903 A | 3/2014 |
| JP | 2017-137710 A | 8/2017 |
| JP | 2019-153984 A | 9/2019 |

OTHER PUBLICATIONS

Japanese Office Action with English translation dated Nov. 9, 2021, 7 pages.

(Continued)

*Primary Examiner* — Michael D Lang
(74) *Attorney, Agent, or Firm* — Rankin, Hill & Clark LLP

(57) ABSTRACT

A vehicle control device includes: a key authentication unit for permitting use of a vehicle in a portable key ride mode when an authentication with a portable key is successful, and permitting use of the vehicle in an electronic key ride mode when an authentication with an electronic key is successful; a power state recognition unit for recognizing a state of power of the vehicle; a door opening and closing recognition unit for recognizing an open and closed state of a door of the vehicle, a notification control unit for issuing a first notification in the portable key ride mode and issuing a second notification in the electronic key ride mode, when the door opening and closing recognition unit recognizes that the driver's seat door of the vehicle is switched from a closed state to an open state while the power state recognition unit recognizes that the power is on.

4 Claims, 5 Drawing Sheets

(56) References Cited

OTHER PUBLICATIONS

Japanese Office Action with English Translation dated Jul. 6, 2021, 7 pages.
Japanese Office Action dated Feb. 1, 2022, English translation included, 9 pages.
Chinese Office Action dated Jun. 29, 2022 issued in corresponding Chinese Application No. CN 202011076692.X; English machine translation included (16 pages).

* cited by examiner

FIG.1
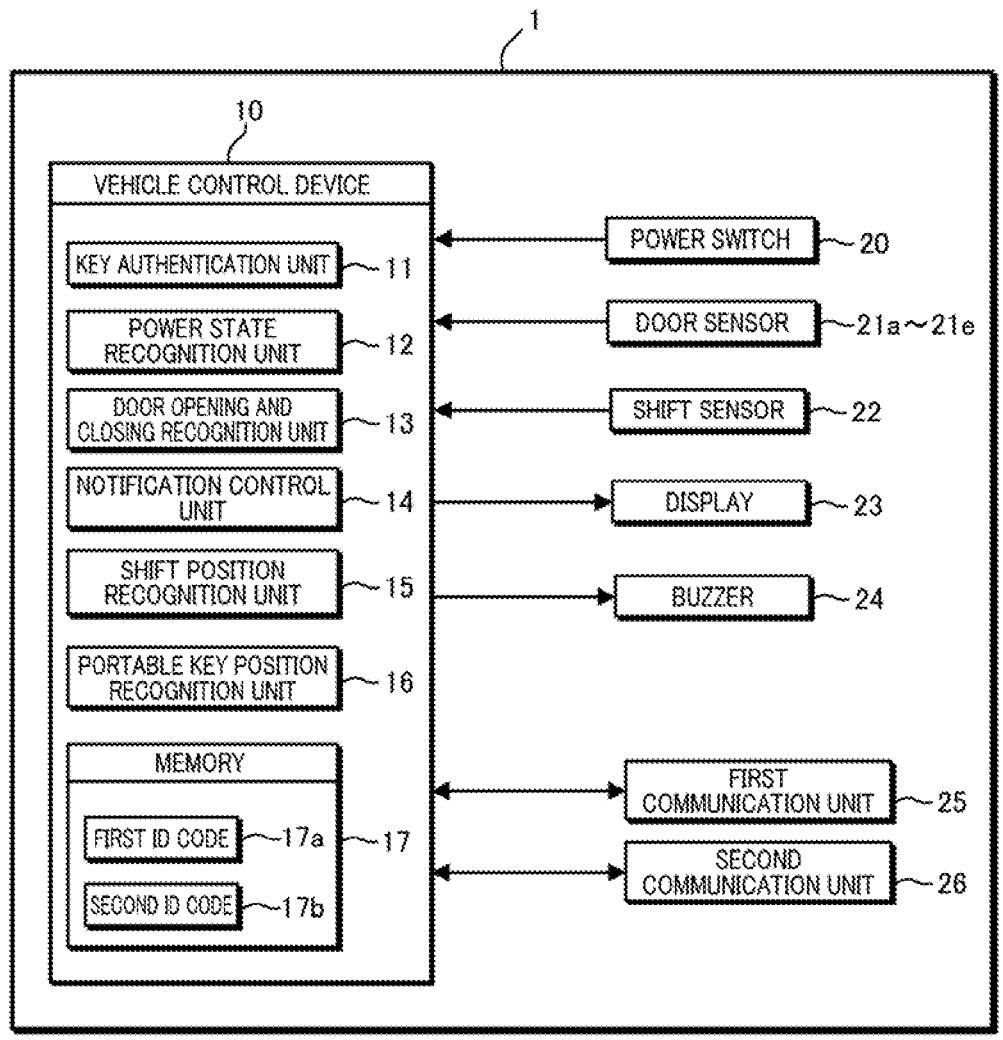
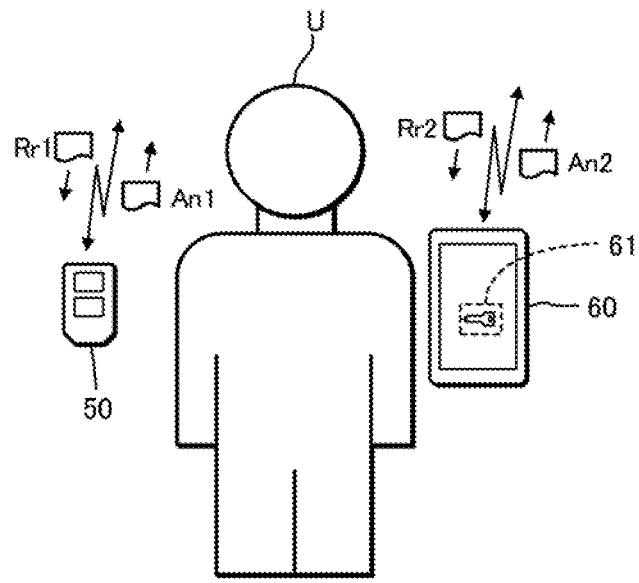

VEHICLE CONTROL DEVICE AND VEHICLE

INCORPORATION BY REFERENCE

The present application claims priority under 35 U.S.C. § 119 to Japanese Patent Application No. 2019-190339 filed on Oct. 17, 2019. The content of the application is incorporated herein by reference in its entirety.

BACKGROUND OF THE INVENTION

Field of the Invention

The present invention relates to a vehicle control device and a vehicle.

Description of the Related Art

Conventionally, for portable keys that perform authentication with vehicles by short-range wireless communication to permit use of the vehicles, there has been proposed a warning device for a left portable device that issues a warning notification when the user alights from the vehicle, to prevent the portable key from being left inside the vehicle (see, for example, Japanese Patent Laid-Open No. 2004-352018).

In addition to the portable key, in vehicles where electronic keys built into communication terminals such as smartphones are also used as vehicle keys, a notification device has been proposed where the device notifies the user that a communication device is used as a vehicle key by a display device when the vehicle is being used after successful authentication with an electronic key (see, for example, Japanese Patent Laid-Open No. 2014-54902).

As mentioned above, for a vehicle that can be used with a portable key or an electronic key built into a communication terminal, it is not preferable for the user to leave the vehicle while the vehicle is powered on from the perspective of preventing vehicle theft and avoiding unnecessary energy consumption in both cases where the use of the vehicle is permitted with a portable key and the use of the vehicle is permitted with an electronic key.

Aspects of the present invention are designed with respect to such background, and an object of the aspects of the present invention is to provide a vehicle control device and a vehicle that can prevent a user from leaving the vehicle while the vehicle is powered on, regardless of whether the use of the vehicle is permitted with either a portable key or an electronic key.

SUMMARY OF THE INVENTION

A first aspect for achieving the above object includes a vehicle control device including: a key authentication unit for performing an authentication process with a portable key used by a user of a vehicle or with a communication terminal used by the user having a function of an electronic key via wireless communication, where the key authentication unit permits use of the vehicle in a portable key ride mode when an authentication with the portable key is successful, and the key authentication unit permits use of the vehicle in an electronic key ride mode when an authentication with the electronic key is successful; a power state recognition unit for recognizing a state of power of the vehicle; a door opening and closing recognition unit for recognizing an open and closed state of a door of the vehicle; and a notification control unit for issuing a first notification in the portable key ride mode and issuing a second notification in the electronic key ride mode, when the door opening and closing recognition unit recognizes that the driver's seat door of the vehicle is switched from a closed state to an open state while the power state recognition unit recognizes that the power is on.

The vehicle control device may include a shift position recognition unit for recognizing a shift position of a shift operation unit provided in the vehicle, wherein the notification control unit issues a notification prompting the shift position of the shift operation unit to be the parking position, as the first notification and the second notification, when the door opening and closing recognition unit recognizes that the driver's seat door of the vehicle is switched from a closed state to an open state and the shift position recognition unit recognizes that the shift position of the shift operation unit is other than the parking position, while the power state recognition unit recognizes that the power is on.

The vehicle control device may be configured such that, in the electronic key ride mode, the notification control unit issues a notification prompting for turning off the power as the second notification, when the door opening and closing recognition unit recognizes that the driver's seat door of the vehicle is switched from a closed state to an open state and the shift position recognition unit recognizes that the shift position of the shift operation unit is at the parking position, while the power state recognition unit recognizes that the power is on.

The vehicle control device may be configured such that: the key authentication unit performs the authentication process with the portable key via wireless communication in an LF (low frequency) band, and performs the authentication process with the communication terminal via wireless communication in a UHF (ultra-high frequency) band; the vehicle control device includes a portable key position recognition unit that recognizes whether the portable key is inside the vehicle based on a response status of the portable key to a transmission of an LF band monitoring signal for the portable key; and the notification control unit issues a notification giving a notice of that the portable key is not inside the vehicle, as the first notification, and a notification prompting for turning off the power of the vehicle, as the second notification, when the door opening and closing recognition unit recognizes that the driver's seat door of the vehicle is switched from an open state to a closed state after recognizing that the door has been switched from a closed state to an open state and the portable key position recognition unit recognizes that the portable key is not inside the vehicle, while the power state recognition unit recognizes that the power is on.

A second aspect for achieving the above object includes a vehicle including the above vehicle control device.

Effects of the Invention

According to the vehicle control device of the aspects of the present invention, when the driver's seat door is opened while the vehicle is powered on, the first notification is made where the authentication process with the portable key has been performed and the second notification is made where the authentication with the electronic key has been performed. In this way, the notification contents are set according to the key used for authentication, and this enables issuing a proper notification about the key that the vehicle user uses and enables the user to prevent leaving the vehicle while the vehicle is powered on.

BRIEF DESCRIPTION OF THE DRAWINGS

FIG. 1 is an explanatory diagram of a configuration of a vehicle equipped with a vehicle control device;

DETAILED DESCRIPTION OF THE PREFERRED EMBODIMENTS

[1. Vehicle Configuration]

Figure 2:
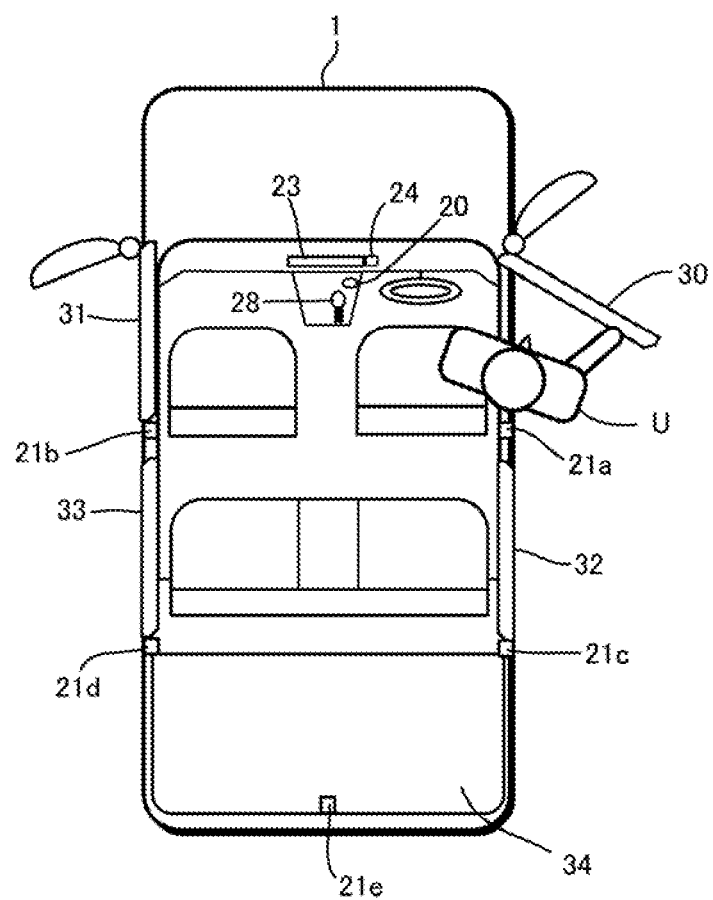
FIG. 2 is an explanatory diagram illustrating a situation in which a user opens a driver's seat door and alights from the vehicle.

The configuration of the vehicle 1 according to this embodiment is described with reference to FIGS. 1 and 2. The vehicle 1 includes a vehicle control device 10 for controlling the operation of the vehicle 1, a power switch 20 for instructing switching on and off of the power of the vehicle 1, and door sensors 21a to 21e for detecting an open and closed state of a driver's seat door 30, a passenger seat door 31, a right rear seat door 32, a left rear seat door 33, and a back door (trunk door) 34 of the vehicle 1, respectively.

Further, the vehicle 1 includes a shift sensor 22 for detecting a shift position of a shift lever 28 (corresponding to a shift operation unit of the present invention), a display 23, a buzzer 24, a first communication unit 25, and a second communication unit 26. The display 23 is provided on a dashboard and displays various information to the occupants of the vehicle 1. The display 23 may be arranged at a position visible to the user U of the vehicle 1, and may be arranged, for example, in a meter display unit (not shown) that displays the traveling speed of the vehicle 1 and the like.

The first communication unit 25 performs wireless communication with the portable key 50 that the user U of the vehicle 1 uses. Here, a radio wave in an LF (Low Frequency) band (30-300 kHz) is transmitted from the first communication unit 25 to the portable key 50, and a radio wave in a UHF (Ultra-High Frequency) band (300 MHz-3 GHz) is transmitted from the portable key 50 to the first communication unit 25.

In addition, the second communication unit 26 performs communication using a UHF band radio waves such as Bluetooth (registered trademark) between communication terminal 60 (smartphone, tablet terminal, mobile phone, etc.) that the user U uses. An electronic key application (application program) is installed in the communication terminal 60, and the communication terminal 60 functions as the electronic key 61 of the vehicle 1 by executing the electronic key application.

The vehicle control device 10 is an electronic circuit unit configured with a CPU (Central Processing Unit), a memory 17, and the like, which are not shown. The CPU reads and executes the control program of the vehicle control device 10 stored in the memory 17 to function as a key authentication unit 11, a power state recognition unit 12, a door opening and closing recognition unit 13, a notification control unit 14, a shift position recognition unit 15, and a portable key position recognition unit 16. The memory 17 stores a first ID code 17a corresponding to the portable key 50 and a second ID code 17b corresponding to the electronic key 61.

The key authentication unit 11 sends a first response request signal Rr1 targeting the portable key 50 via the first communication unit 25, and also sends a second response request signal Rr2 targeting the electronic key 61 of the communication terminal 60 via the second communication unit 26. Then, when the key authentication unit 11 receives a first response signal An1 from the portable key 50, it executes an authentication process of collating the ID code included in the first response signal An1 with the first ID code 17a, and permits the use of the vehicle 1 with the portable key 50 when the both match (an authentication with the portable key 50 is successful).

Similarly, when the key authentication unit 11 receives a second response signal An2 from the communication terminal 60, it executes an authentication process of collating the ID code included in the second response signal An2 with the second ID code 17b. Then, when the both are identical to each other, the key authentication unit 11 permits the use of the vehicle 1 with the electronic key 61 (an authentication with the electronic key 61 is successful).

The power state recognition unit 12 recognizes a state of the power (not shown) of the vehicle 1 which is switched by an operation of the power switch 20 by the user U. The vehicle 1 is switched between a power-on state (power mode on) and a power-off state (power mode off) each time the power switch 20 is operated. The door opening and closing recognition unit 13 recognizes an open and closed state of each of the doors 30 to 34 based on the detection status of the door sensors 21a to 21e. Further, the door opening and closing recognition unit 13 stores the recognition history of the open and closed state of the right rear seat door 32 and the left rear seat door 33 in the memory 17, to determine whether a "rear seat check" screen 103 (see FIG. 5) described later needs to be displayed.

As shown in FIG. 2, when the user U opens the driver's seat door 30 and the door opening and closing recognition unit 13 recognizes that the driver's seat door 30 is switched from a closed state to an open state, the notification control unit 14 displays a notification screen on the display 23 according to the situation at the time of switching. In addition, when the door opening and closing recognition unit 13 recognizes that any one of the passenger seat door 31, the right rear seat door 32, and the left rear seat door 33 is switched from a closed state to an open state, the notification control unit 14 also may display a notification screen on the display 23 according to the situation at the time of the switching. The shift position recognition unit 15 recognizes the shift position of the shift lever 28 detected by the shift sensor 22.

The portable key position recognition unit 16 recognizes whether the portable key 50 is located inside the vehicle 1 based on the response status of the portable key 50 to a monitoring signal sent from the first communication unit 25 to the portable key 50. Here, the intensity of the radio wave in the LF band transmitted from the first communication unit 25 is set not to reach the portable key 50 located outside the vehicle 1. Therefore, the portable key position recognition unit 16 can recognize that the portable key 50 is not inside the vehicle 1 when there is no response from the portable key 50 to the monitoring signal sent to the portable key 50.

[2. Ride Mode Setting]

Figure 3:
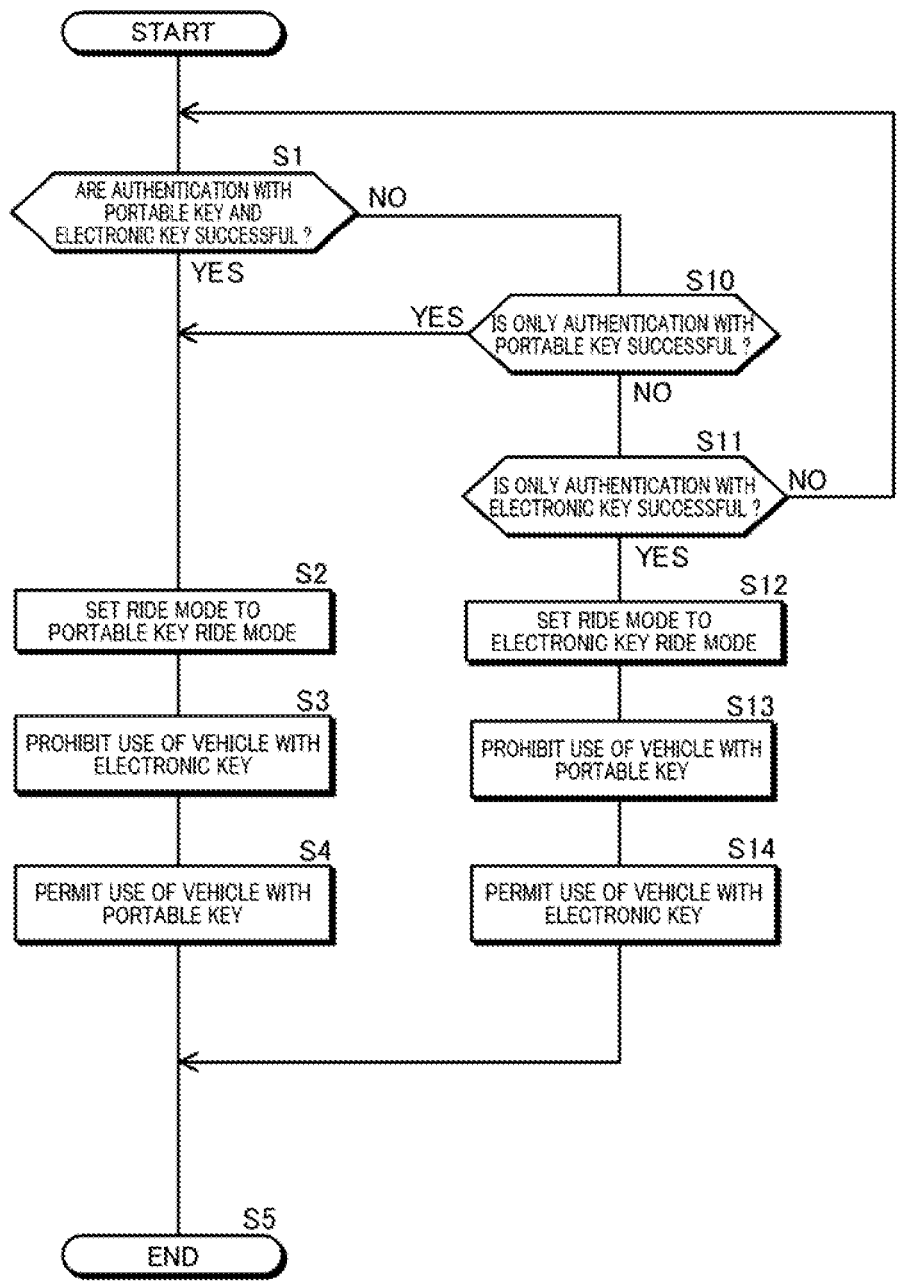
FIG. 3 is a flowchart of an authentication process using a portable key and an electronic key.

A ride mode setting process by the key authentication unit 11 is described below according to the flowchart shown in FIG. 3. The key authentication unit 11 determines whether the authentication with the portable key 50 and the electronic key 61 of the communication terminal 60 are successful by loop processing of step S1, step S10, and step S11 of FIG. 3.

Then, the key authentication unit 11 advances the process to step S2 when the authentications with the portable key 50 and the electronic key 61 are successful in step S1 and when the authentication with the portable key 50 is successful in step S10. Further, when only the authentication with the electronic key 61 is successful in step S11, the key authentication unit 11 advances the process to step S12.

The key authentication unit 11 sets the ride mode of the vehicle 1 to a portable key ride mode in step S2, and prohibits the use of the vehicle 1 with the electronic key 61 in the subsequent step S3 to avoid conflict between the use of the vehicle 1 with the portable key 50 and the use of the vehicle 1 with the electronic key 61. In the next step S4, the key authentication unit 11 permits the use of the vehicle 1 with the portable key 50, and this enables the user U to use the vehicle 1. In this way, when both the authentication with the portable key 50 and the authentication with the electronic key 61 are successful, the authentication with the portable key 50 is prioritized and the portable key ride mode is set.

The key authentication unit 11 sets the ride mode of the vehicle 1 to an electronic key ride mode in step S12, and prohibits the use of the vehicle 1 with the portable key 50 in the subsequent step S13 to avoid conflict between the use of the vehicle 1 with the electronic key 61 and the use of the vehicle 1 with the portable key 50. In the next step S14, the key authentication unit 11 permits the use of the vehicle 1 with the electronic key 61, and this enables the user U to use the vehicle 1.

Note that, in this embodiment, as described above, when both the authentication with the portable key 50 and the authentication with the electronic key 61 are successful, the authentication with the portable key 50 is prioritized and the portable key ride mode is set, however, the embodiment may be the one such that what is authenticated first is prioritized. That is, the embodiment may be the one in which, when the authentication with the portable key 50 succeeds first, the portable key ride mode is set, and when the authentication with the electronic key 61 succeeds first, the electronic key ride mode is set.

[3. Notification Process When the Driver's Seat Door Is Opened]

The notification process when the driver's seat door 30 is opened is described below according to the flowchart shown in FIG. 4 with reference to a notification screen table 100 shown in FIG. 5.

Figure 4:
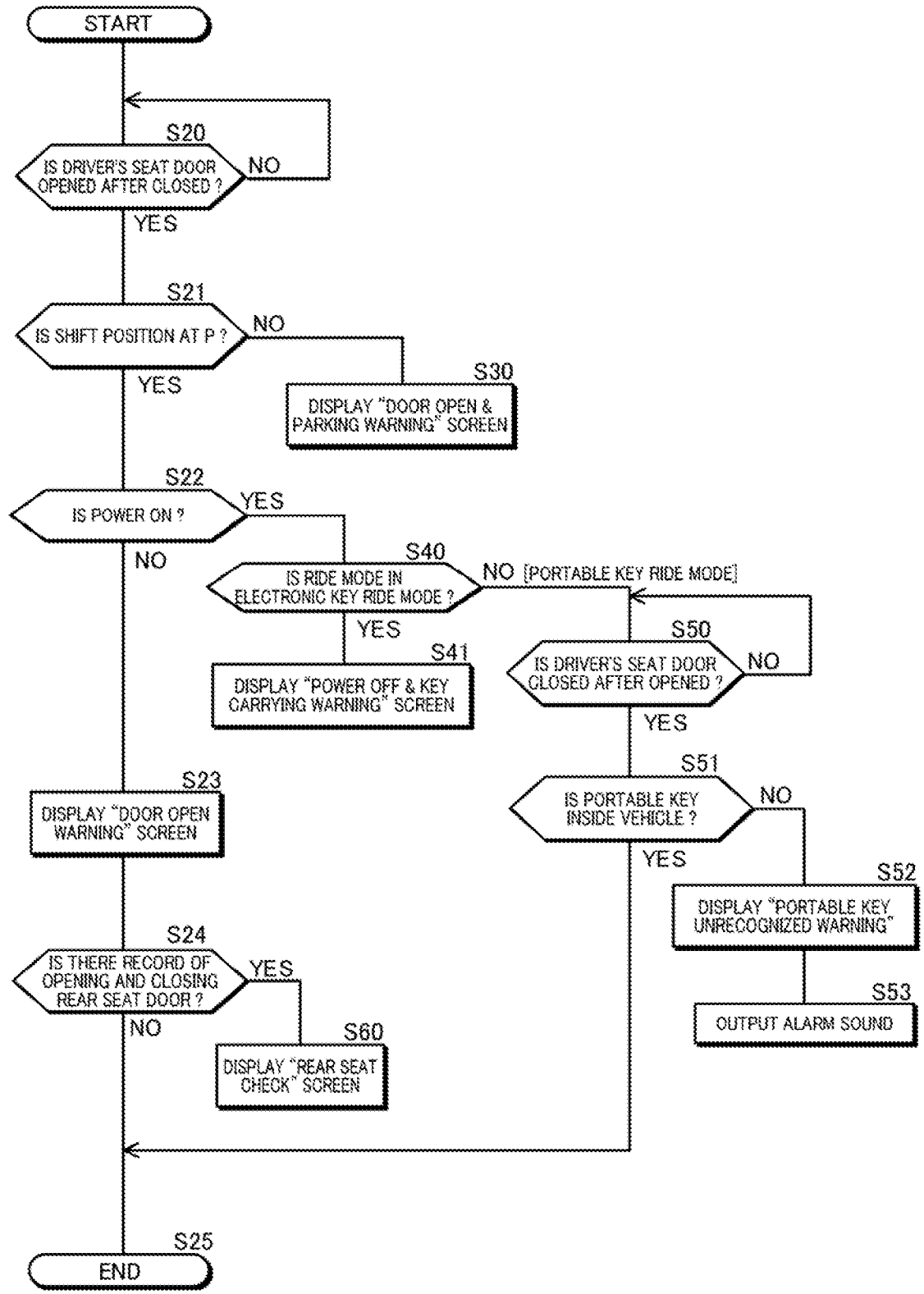
FIG. 4 is a flowchart of a process of selecting a notification screen according to the situation when the driver's seat door is opened.

When the key authentication unit 11 succeeds in the authentication with the portable key 50 and permits the use of the vehicle 1 in the portable key ride mode, and when it succeeds in the authentication with the electronic key 61 of the communication terminal 60 and permits the use of the vehicle 1 in the electronic key ride mode, the notification control unit 14 executes the processes according to the flowchart shown in FIG. 4.

In step S20 in FIG. 4, the notification control unit 14 advances the process to step S21 when the door opening and closing recognition unit 13 recognizes that the driver's seat door 30 is switched from a closed state to an open state. In step S21, the notification control unit 14 determines whether the shift position recognition unit 15 recognizes that the shift position of the shift lever 28 is at the P position (parking position). Then, when the shift position of the shift lever 28 is recognized to be at the P position, the notification control unit 14 advances the process to step S22.

Figure 5:
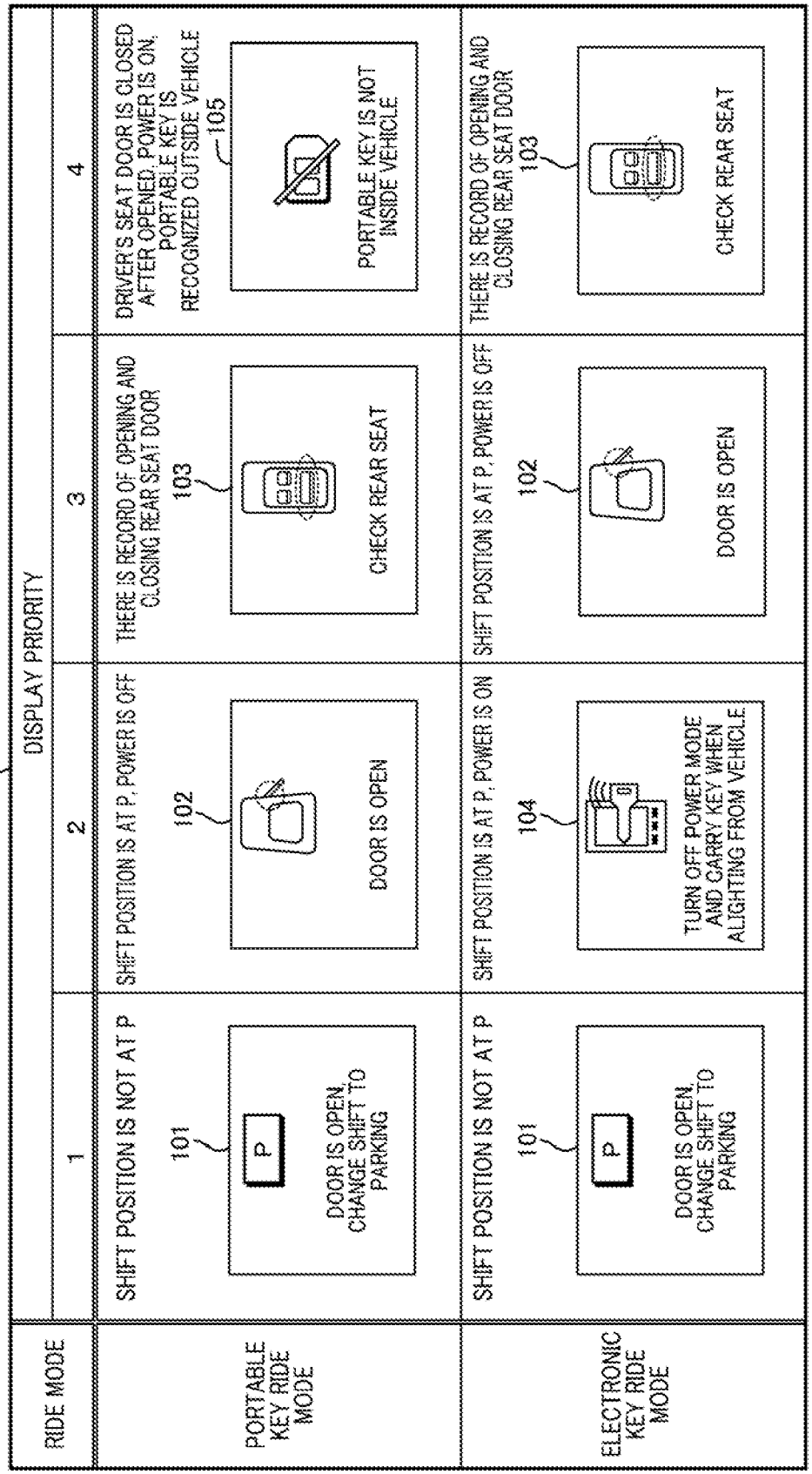
FIG. 5 is an explanatory diagram of a notification screen being displayed when the driver's seat door is opened.

On the other hand, when the shift position of the shift lever 28 is recognized to be at other position than the P position, the notification control unit 14 advances the process to step S30, and displays the "door open & parking warning" screen 101 shown in the notification screen table 100 of FIG. 5, on the display 23, (which corresponds to a first notification and a second notification of the present invention). That is, when the user U opens the driver's seat door 30 without shifting the shift lever 28 to the P position, the "door open & parking warning" screen 101 is displayed on the display 23 whether in the portable key ride mode or in the electronic key ride mode. This can prompt the user U to operate the shift lever 28 to be at the P position (to operate it for fixing the shaft of the transmission of the vehicle 1) before alighting from the vehicle.

In step S22, the notification control unit 14 determines whether the power state recognition unit 12 has recognized that the vehicle 1 is in the power-on state. Then, the notification control unit 14 advances the process to step S40 when the vehicle 1 is recognized to be in the power-on state, and advances the process to step S23 when the vehicle 1 is not recognized to be in the power-on state.

In step S23, the notification control unit 14 displays the "door open warning" screen 102 shown in the notification screen table 100 of FIG. 5 on the display 23 and advances the process to step S24. In step S24, the notification control unit 14 refers to the opening and closing history of the right rear seat door 32 and the left rear seat door 33 to determine whether there is an opening and closing history of the right rear seat door 32 or the left rear seat door 33 in the current use of vehicle 1. The history has been stored in the memory 17 by the door opening and closing recognition unit 13. When there is an opening and closing history of the right rear seat door 32 or the left rear seat door 33, it is inferred that there has been a boarding or luggage placement on a rear seat.

Then, when there is an opening and closing history of the right rear seat door 32 or the left rear seat door 33, the notification control unit 14 advances the process to step S60, and displays the "rear seat check" screen 103 shown in the notification screen table 100 of FIG. 5 on the display 23. This can prevent forgetting to take an item placed on the rear seat. On the other hand, when there is no opening and closing history of the right rear seat door 32 and the left rear seat door 33, the notification control unit 14 advances the process to step S26, and does not display the "rear seat check" screen 103 on the display 23 in this case.

In step S40, the notification control unit 14 determines whether the electronic key ride mode is set. Then, the notification control unit 14 advances the process to step S41 in the electronic key ride mode, and displays the "power off & key carrying warning" screen 104 shown in the notification screen table 100 of FIG. 5 on the display 23, (which corresponds to a second notification of the present invention). This prompts the user U to turn off the power and carry the communication terminal, and enables the user U to prevent leaving the vehicle 1 in the power-on state and to prevent leaving the communication terminal 60 in the vehicle interior of the vehicle 1.

On the other hand, when the ride mode is not in the electronic key ride mode (in the portable key ride mode), the notification control unit 14 advances the process to step S50. The notification control unit 14 waits for the door opening and closing recognition unit 13 to recognize that the driver's seat door 30 is switched from an open state to a closed state in step S50, and then advances the process to step S51.

In step S51, the notification control unit 14 determines whether the portable key position recognition unit 16 recognizes that the portable key 50 is located outside the vehicle 1. Then, the notification control unit 14 advances the process to step S52 when the portable key 50 is recognized to be located outside the vehicle, and displays the "portable key unrecognized warning" screen 105 shown in the notification screen table 100 of FIG. 5, on the display 23, (which corresponds to a first notification of the present invention).

Further, in the subsequent step S53, the notification control unit 14 causes a buzzer 24 to sound and outputs an alarm sound. Thus, the "portable key unrecognized warning" screen 105 is displayed and the alarm sound by the buzzer 24 is output to issue a warning to the user U about leaving the vehicle 1 in the power-on state with the portable key 50 in hand, and this enables prompting the power off operation of the vehicle 1.

[4. Other Embodiments]

In the above embodiment, the shift position recognition unit 15 is provided to determine whether the shift position of the shift lever 28 is at the parking position when the driver's seat door 30 of the vehicle 1 is opened, and the "door open" & parking warning" screen 101 is displayed on the display 23. As another embodiment, the shift position recognition unit 15 may be omitted and the "door open & parking warning" screen 101 may not be displayed.

In the above embodiment, when the driver's seat door 30 is opened in power-on state in step S41 of FIG. 4 in the electronic key ride mode, the notification control unit 14 displays the "power off & key carrying warning" screen 104 for prompting the power off and carrying the communication terminal 60, on the display 23. As yet another embodiment, a screen prompting only power off may be displayed on the display 23.

In the above embodiment, as shown in FIG. 5, the notification by the notification control unit 14 is issued by displaying the notification screen on the display 23, but the notification may be issued by outputting a voice guidance. Alternatively, the notification may be issued by both displaying a notification screen on the display 23 and outputting a voice guidance.

Note that, FIGS. 1 and 2 are schematic diagrams showing the configurations of the vehicle 1 and the vehicle control device 10 classified according to main processing contents in order to facilitate understanding of the present invention, and the configurations of the vehicle 1 and the vehicle control device 10 may be configured using other divisions. Further, the process of each component may be executed by one hardware unit or may be executed by a plurality of hardware units. Further, the processes by the respective components shown in FIGS. 3 and 4 may be executed by one program, or may be executed by a plurality of programs.

[5. Configurations Supported by the Above Embodiments]

The above embodiments are specific examples of the following configurations.

(Item 1) A Vehicle Control Device Comprising:

a key authentication unit for performing an authentication process with a portable key used by a user of a vehicle or with a communication terminal used by the user via wireless communication, the communication terminal having a function of an electronic key, the key authentication unit permitting use of the vehicle in a portable key ride mode when an authentication with the portable key is successful, the key authentication unit permitting use of the vehicle in an electronic key ride mode when an authentication with the electronic key is successful;

a power state recognition unit for recognizing a state of power of the vehicle;

a door opening and closing recognition unit for recognizing an open and closed state of a door of the vehicle; and a notification control unit for issuing a first notification in the portable key ride mode and issuing a second notification in the electronic key ride mode, when the door opening and closing recognition unit recognizes that the driver's seat door of the vehicle is switched from a closed state to an open state while the power state recognition unit recognizes that the power is on.

According to the vehicle control device of Item 1, when the driver's seat door is opened while the vehicle is powered on, the first notification is made when an authentication process with the portable key has been performed, and the second notification is made when an authentication with the electronic key has been performed. In this way, the notification contents are set according to the key used for authentication, and this enables issuing a proper notification about the key that the vehicle user uses and enables the user to prevent leaving the vehicle while the vehicle is powered on.

(Item 2) The vehicle control device according to Item 1, comprising a shift position recognition unit for recognizing a shift position of a shift operation unit provided in the vehicle, wherein the notification control unit issues a notification prompting the shift position of the shift operation unit to be the parking position, as the first notification and the second notification, when the door opening and closing recognition unit recognizes that the driver's seat door of the vehicle is switched from a closed state to an open state and the shift position recognition unit recognizes that the shift position of the shift operation unit is other than the parking position, while the power state recognition unit recognizes that the power is on.

According to the vehicle control device of Item 2, when the driver's seat door is opened while the shift position of the shift operation unit is not at the parking position whether in the portable key ride mode or in the electronic key ride mode, a notification is issued to prompt for shifting the shift position of the shift operation unit to the parking position, and this enables the user to prevent leaving the vehicle while the shift position of the shift operation unit is other than the parking position.

(Item 3) The vehicle control device according to Item 2, wherein the notification control unit issues a notification prompting for turning off the power in the electronic key ride mode, as the second notification, when the door opening and closing recognition unit recognizes that the driver's seat door of the vehicle is switched from a closed state to an open state and the shift position recognition unit recognizes that the shift position of the shift operation unit is at the parking position, while the power state recognition unit recognizes that the power is on.

According to the vehicle control device of Item 3, when the driver's seat door is opened while the power is on and the shift position of the shift operation unit is at the parking position in the electronic key ride mode, a notification is issued for turning off the power, and this enables the user who is permitted to use the vehicle with the electronic key of the communication terminal to prevent leaving the vehicle without turning off the power.

(Item 4) The vehicle control device according to Item 1, wherein:

the key authentication unit performs the authentication process with the portable key via wireless communication in an LF (low frequency) band, and performs the authentication process with the communication terminal via wireless communication in a UHF (ultra-high frequency) band;

the vehicle control device comprises a portable key position recognition unit, the portable key position recognition unit recognizing whether the portable key is inside the vehicle based on a response status of the portable key to a transmission of an LF band monitoring signal for the portable key; and the notification control unit issues a notification giving a notice of that the portable key is not inside the vehicle, as the first notification, and a notification to prompt turning off the power of the vehicle, as the second notification, when the door opening and closing recognition unit recognizes that the driver's seat door of the vehicle is switched from an open state to a closed state after recognizing that door has been switched from a closed state to an open state and the portable key position recognition unit recognizes that the portable key is not inside the vehicle, while the power state recognition unit recognizes that the power is on.

According to the vehicle control device of Item 4, the portable key, which performs wireless communication in an LF band to enable the portable key position recognition unit to recognize whether the key is inside the vehicle, can notify that the portable key is not inside the vehicle to prompt turning off the power when the driver's seat door switches from an open state to a closed state. On the other hand, with the communication terminal, which performs wireless communication in a UHF band and the position cannot be recognized by the same method as the portable key position recognition unit, a notification that prompts turning off the power of the vehicle can be issued when the driver's seat door is opened.

(Item 5) A vehicle comprising the vehicle control device according to any one of Items 1 to 4.

According to the vehicle of Item 5, there can be provided a vehicle having at least one of functions of Items 1 to 4 described above.

REFERENCE SIGNS LIST

1 . . . vehicle, 10 . . . vehicle control device, 11 . . . key authentication unit, 12 . . . power state recognition unit, 13 . . . door opening and closing recognition unit, 14 . . . notification control unit, 15 . . . shift position recognition unit, 16 . . . portable key position recognition unit, 17 . . . memory, 17$a$ . . . first ID code, 17$b$ . . . second ID code, 20 . . . power switch, 21$a$-21$e$ . . . door sensor, 22 . . . shift sensor, 23 . . . display, 24 . . . buzzer, 25 . . . first communication unit, 26 . . . second communication unit, 28 . . . shift lever, 30 . . . driver's seat door, 50 . . . portable key, 60 . . . communication terminal, 61 . . . electronic key, U . . . user.

What is claimed is:

1. A vehicle control device comprising a processor, wherein the processor includes:

a key authentication unit for performing an authentication process with a portable key used by a user of a vehicle or with a communication terminal used by the user via wireless communication, the communication terminal having a function of an electronic key, the key authentication unit permitting use of the vehicle in a portable key ride mode when an authentication with the portable key is successful, the key authentication unit permitting use of the vehicle in an electronic key ride mode when an authentication with the electronic key is successful;

a power state recognition unit for recognizing a state of power of the vehicle;

a door opening and closing recognition unit for recognizing an open and closed state of a door of the vehicle;

a notification control unit for issuing a first notification in the portable key ride mode and issuing a second notification in the electronic key ride mode, when the door opening and closing recognition unit recognizes that the driver's seat door of the vehicle is switched from a closed state to an open state while the power state recognition unit recognizes that the power is on; and a shift position recognition unit for recognizing a shift position of a shift operation unit provided in the vehicle, wherein the notification control unit issues a notification prompting the shift position of the shift operation unit to be the parking position, as the first notification and the second notification, when the door opening and closing recognition unit recognizes that the driver's seat door of the vehicle is switched from a closed state to an open state and the shift position recognition unit recognizes that the shift position of the shift operation unit is other than the parking position, while the power state recognition unit recognizes that the power is on.

2. The vehicle control device according to claim 1, wherein the notification control unit issues a notification prompting for turning off the power in the electronic key ride mode, as the second notification, when the door opening and closing recognition unit recognizes that the driver's seat door of the vehicle is switched from a closed state to an open state and the shift position recognition unit recognizes that the shift position of the shift operation unit is at the parking position, while the power state recognition unit recognizes that the power is on.

3. The vehicle control device according to claim 1, wherein:

the key authentication unit performs the authentication process with the portable key via wireless communication in an LF (low frequency) band, and performs the authentication process with the communication terminal via wireless communication in a UHF (ultra-high frequency) band;

the processor comprises a portable key position recognition unit, the portable key position recognition unit recognizing whether the portable key is inside the vehicle based on a response status of the portable key to a transmission of an LF band monitoring signal for the portable key; and the notification control unit issues a notification giving a notice of that the portable key is not inside the vehicle, as the first notification, and a notification to prompt turning off the power of the vehicle, as the second notification, when the door opening and closing recognition unit recognizes that the driver's seat door of the vehicle is switched from an open state to a closed state after recognizing that door has been switched from a closed state to an open state and the portable key position recognition unit recognizes that the portable key is not inside the vehicle, while the power state recognition unit recognizes that the power is on.

4. A vehicle comprising a vehicle control device,
the vehicle control device including a processor, wherein the processor includes:
- a key authentication unit for performing an authentication process with a portable key used by a user of a vehicle or with a communication terminal used by the user via wireless communication, the communication terminal having a function of an electronic key, the key authentication unit permitting use of the vehicle in a portable key ride mode when an authentication with the portable key is successful, the key authentication unit permitting use of the vehicle in an electronic key ride mode when an authentication with the electronic key is successful;
- a power state recognition unit for recognizing a state of power supply of the vehicle;
- a door opening and closing recognition unit for recognizing an open and closed state of a door of the vehicle;
- a notification control unit for issuing a first notification in the portable key ride mode and issuing a second notification in the electronic key ride mode, when the door opening and closing recognition unit recognizes that the driver's seat door of the vehicle is switched from a closed state to an open state while the power state recognition unit recognizes that the power supply is on; and
- a shift position recognition unit for recognizing a shift position of a shift operation unit provided in the vehicle, wherein the notification control unit issues a notification prompting the shift position of the shift operation unit to be the parking position, as the first notification and the second notification, when the door opening and closing recognition unit recognizes that the driver's seat door of the vehicle is switched from a closed state to an open state and the shift position recognition unit recognizes that the shift position of the shift operation unit is other than the parking position, while the power state recognition unit recognizes that the power is on.

* * * * *